US00RE40041E

(19) United States
(12) Reissued Patent
Sayers

(10) Patent Number: US RE40,041 E
(45) **Date of Reissued Patent: *Feb. 5, 2008**

(54) WINDOW FRAME FOR MANUFACTURED HOUSING

(75) Inventor: Leland D. Sayers, Knoxville, TN (US)

(73) Assignee: Sealmaster, L.L.C.

( * ) Notice: This patent is subject to a terminal disclaimer.

(21) Appl. No.: 10/219,573

(22) Filed: Aug. 15, 2002

Related U.S. Patent Documents

Reissue of:
(64) Patent No.: 5,660,010
Issued: Aug. 26, 1997
Appl. No.: 08/347,907
Filed: Dec. 1, 1994

U.S. Applications:
(63) Continuation of application No. 07/934,257, filed on Aug. 25, 1992, now Pat. No. 5,392,574, which is a continuation-in-part of application No. 07/570,818, filed on Aug. 22, 1990, now abandoned, which is a continuation-in-part of application No. 07/338,306, filed on Apr. 17, 1989, now abandoned, which is a continuation-in-part of application No. 07/083,255, filed on Aug. 10, 1987, now Pat. No. 4,747,753.

(51) Int. Cl.
*E06B 1/26* (2006.01)
*E06B 1/36* (2006.01)

(52) U.S. Cl. ..... 52/217; 52/204.5; 52/204.55; 52/204.56; 52/210; 52/211; 52/213; 49/DIG. 2

(58) Field of Classification Search ..... 52/217, 52/213, 204.55, 204.56, 204.5, 210, 211, 52/656.5; 49/DIG. 2
See application file for complete search history.

(56) References Cited

U.S. PATENT DOCUMENTS 2,326,549 A 8/1943 Miller
2,454,523 A 11/1948 Philip
2,718,291 A 9/1955 Goldberg (Continued)

FOREIGN PATENT DOCUMENTS

DE 2539383 3/1976
DE 1960024 10/1977

OTHER PUBLICATIONS

Alcan Building Products, *Alcan Thermally Superior Weatherbuffer*, 1980.
Silverline Building Products, *Silverline 1600 S/H.*
Sentinel Aluminum & Schelenberg Industries, *Aluminum Windows for Metal Buildings.*
Remington, *Remington Door.*
Alcan Building Products, *Sunview Aluminum Window and Door System*, Oct. 10, 1983.

(Continued)

*Primary Examiner*—Jeanette E. Chapman
(74) *Attorney, Agent, or Firm*—Wood, Herron & Evans, L.L.P.

(57) ABSTRACT

A window frame construction particularly useful in a manufactured housing unit to provide a structure for receiving and supporting at least one window and to provide coverage of ends of siding applied to the exterior of the housing unit. The window frame includes a window body member to generally circumscribe an opening in the housing unit, with a J-rail return member integrally formed therewith to provide a flange member for attachment of the window frame to the housing unit and to cover and secure ends of the siding in a slot formed between the flange member and the return member of the J-rail return. The return member has sufficient width to cover the siding ends even when the siding contracts during lowered temperatures. The window frame, in the preferred form, is constructed from extruded vinyl, and it is used principally for vinyl siding.

13 Claims, 4 Drawing Sheets

U.S. PATENT DOCUMENTS

| | | | | | |
|---|---|---|---|---|---|
| 2,725,608 | A | | 12/1955 | Parslow | |
| 2,733,787 | A | | 2/1956 | Morra | |
| 2,770,335 | A | | 11/1956 | Sylvan | |
| 2,826,282 | A | | 3/1958 | Goldberg | |
| 2,912,078 | A | | 11/1959 | Kiehl et al. | |
| 2,983,001 | A | | 5/1961 | Guldager | 52/208 |
| 3,239,976 | A | | 3/1966 | Hall | 52/202 |
| 3,416,271 | A | | 12/1968 | Heeney | |
| 3,583,114 | A | | 6/1971 | Belfor | |
| 3,715,836 | A | | 2/1973 | Monroe | |
| 3,800,488 | A | | 4/1974 | Swanson | |
| 3,943,679 | A | | 3/1976 | Dissinger | |
| 4,280,309 | A | * | 7/1981 | Huelsekopf | 52/204.54 |
| 4,299,060 | A | | 11/1981 | Tippmann | 52/212 X |
| 4,413,446 | A | | 11/1983 | Dittrich | |
| 4,521,991 | A | * | 6/1985 | Sayer et al. | 49/161 |
| 4,555,868 | A | * | 12/1985 | Mancuso | 49/181 |
| 4,563,846 | A | * | 1/1986 | Webb | 52/208 |
| 4,608,800 | A | | 9/1986 | Fredette | |
| 4,624,091 | A | * | 11/1986 | Biro | 52/656.5 |
| 4,694,612 | A | | 9/1987 | Pruden et al. | |
| 4,787,184 | A | * | 11/1988 | Boidron | 52/217 |
| 4,958,468 | A | | 9/1990 | Nolan | 52/204.51 |
| 5,018,325 | A | * | 5/1991 | Geen et al. | 52/211 |
| 5,392,574 | A | | 2/1995 | Sayers | 52/204.55 X |

OTHER PUBLICATIONS

Miller Industries, *Single Hung*.
Peerless, *Single Hung Tilt Sash Nailing Fin*.
Norandex, *Norguard Series 500*.
Victor Sun Control of Philadelphia, Inc., *Victor Sun Control*.
Remington , *Remington Window*.
Silverline Building Products, *Silverline ATW 1000*.
CertainTeed Window, *CertainTeed Window*.

* cited by examiner

WINDOW FRAME FOR MANUFACTURED HOUSING

Matter enclosed in heavy brackets [ ] appears in the original patent but forms no part of this reissue specification; matter printed in italics indicates the additions made by reissue.

This is a continuation application of application Ser. No. 07/934,257, filed Aug. 25, 1992, now U.S. Pat. No. 5,392, 574, issued Feb. 28, 1995, which is a continuation-in-part application of Ser. No. 07/570,818, filed Aug. 22, 1990, now abandoned, which is a continuation-in-part application of Ser. No. 07/338,306, filed Apr. 17, 1989, now abandoned, which is a continuation-in-part application of Ser. No. 07/083,225, filed Aug. 10, 1987, [abandoned] *now U.S. Pat. No. 4,747,753.*

TECHNICAL FIELD

This invention relates to a window frame construction for principal use in manufactured housing, the frame receiving and supporting at least one window, the frame for being mounted in a window opening provided in a wall structure of the manufactured unit. This particular frame includes an integrally formed "J-rail" or "J-channel" portion such that ends of vinyl or aluminum lap siding applied to the exterior of the housing unit are enclosed even when dimensional changes occur due to thermal effects. In one embodiment the frame of the invention has an inner portion that encloses edges of interior wall covering, this inner portion also having an integral J-rail.

BACKGROUND ART

The manufactured housing industry has undergone a significant evolution in the past two decades. Initially the housing units were constructed using techniques previously employed for mobile homes: small structural frame members covered with a skin of sheet metallic material. The entire unit was wrapped with the skin material and then window openings were cut out to receive window units. These window units had mounting flanges extending around the edges, with these flanges receiving screws for fastening the frames into the structural members. The back surface of the flange normally carried a compound to seal against the building skin. (This structure is illustrated in FIG. 1A).

Although the metal skin construction is continued in use on very low-end economy manufactured housing units, a more decorative and sturdy construction began in about 1985. This improved design utilizes more of the construction techniques of "stick-built" housing in that walls are thicker, and the exterior surface is covered with lap-type siding made of aluminum or vinyl. The principal manufacturers of windows and siding are either the manufacturers of window frames (e.g., Reynolds Aluminum, Mastic, Certainteed, Alcoa, Wolverine.) or are closely related such that the window frames used previously were continued into these newer styles. Thus, window frames with conventional flanges are utilized, with suitable fasteners (screws, staples, etc.) penetrating the mounting flange into the building frame. This use of the same window frame existed even though other window frames had been patented over a several year period. Some of these patents include: U.S. Pat. Nos. 2,326,549; 2,454,523; 2,733,787; 2,770,335; 2,912, 078; 3,239,976; 3,416,271; 3,583,114; 4,280,309; 4,299, 060; 4,413,446 and 4,624,091. Other patents that may be pertinent are German Patents 1,960,024 and 2,539,363.

The manufacturers of the homes with lap siding were faced with the problem of encasing the ends of the vinyl/aluminum lap siding to exclude rain. Also, there is often small misalignment of ends of the siding since the pieces are cut from strips, and both vinyl and aluminum expand and contract significantly under extremes of temperature. The solution utilized by these manufacturers to the enclosure of the ends to meet the requirements was a separate "J-rail" or "J-channel" element attached to the building frame with suitable fasteners. The J-rail has a fastening flange for attachment to the building, an outwardly projecting portion to cover the siding ends, and a return portion to contact the outer surface of the lap siding so that the ends are enclosed even during construction of the siding. In some embodiments this element is abutted to the outer edge of flange of the window frame (see FIG. 1B); and in other embodiments, this element overlaps the flange to hide the flange fasteners (see FIG. 1C). These embodiments of dealing with covering siding ends were "state of the art" at the time of the present invention. Such construction is illustrated in "Rigid Vinyl Siding Application Instructions" a currently-available document published by the Vinyl Siding Institute, The Society of the Plastics Industry, Inc., New York, N.Y. In addition, this separate J-rail construction is shown as state-of-the-art in U.S. Pat. No. 4,608,800 issued Sep. 2, 1986.

Although the J-rail element satisfactorily seals the ends of the lap siding, there are certain drawbacks. For example, there are occasionally color differences between the material of the window frame and that of the J-Rail. There is also a problem that there is separate material that must be carried to (or stored at) a site of fabrication. The main problem is the extra time that is required for its installation-measuring, cutting and fastening of separate pieces. As described in the above-referenced publication, the side J-rail members are cut longer than the height of the window and are notched at the top. Then the free end of the top J-rail flange is mitered at each end, and bent at 90° to fit over the side members. In some installations, a special J-rail configured corner unit is utilized (see above-referenced U.S. Pat. No. 4,608,800). Unless significant care is taken during the cutting, bending and fastening of the J-rail, gaps can occur such that the finished product is less than aesthetically attractive. Caulking is recommended around the window frames prior to this installation of the J-rail units. As stated above, the window frames for these constructions are substantially the same as in earlier manufactured homes (and for retrofit installation) with a nailing flange near the outer portion of the unit. Thus, although the other structural portions of manufactured homes have changed, the window manufacturers apparently did not consider other known windows to be of use for this type of siding. Accordingly, they have not varied the window frames significantly to match the other building fabrication changes.

Therefore, it is an object of the present invention to provide a window frame that does not require the utilization of a separate J-rail for enclosing ends of lap siding.

It is another object of the present invention to provide a J-rail construction in an integral combination with a support for at least one window wherein there is a color match.

A further object of the present invention is to provide a window frame construction that significantly simplifies the installation of windows into housing units with a saving of materials and labor.

It is also another object of the present invention to provide a window frame construction that is very functional, and is aesthetically attractive to the viewer.

Another object of the present invention is to provide a universal window frame for use in manufactured housing that increases the speed of fabrication by significantly reducing the labor of installing windows in this type of housing.

These and other objects of the present invention will become apparent upon a consideration of the appended drawings and a complete description thereof that follows.

DISCLOSURE OF THE INVENTION

In accordance with the present invention, there is provided a window frame for being received in an opening of a wall of a structure, the window frame for receiving and supporting at least one window. This frame has a body portion circumscribing the wall opening with a window receptor intermediate an inner portion of the body portion extending toward an inner wall of the structure and an outer portion of the body portion extending proximate an outer frame wall of the structure. A J-rail portion is integrally formed with the body portion so as to project outwardly from the body portion to receive and cover ends of lap siding elements applied to the outer frame wall of the structure. This J-rail portion includes a flange portion to receive fasteners for securing the window frame to the outer frame wall of the structure, an outwardly-extending portion to cover the siding ends, and a return portion for overlapping ends of the lap siding elements, the ends being held between the flange portion and the return portion to provide a weather seal. The return portion has sufficient length to provide coverage of the lap siding ends under all conditions of dimensional change due to temperature variations.

BRIEF DESCRIPTION OF THE DRAWINGS

FIG. 1A is a drawing showing one embodiment of a state-of-the-art window frame as utilized in manufactured housing fabrication where the exterior of the housing unit is made up of sheet metal or the like.

BEST MODE FOR CARRYING OUT THE INVENTION

Figure 1A:
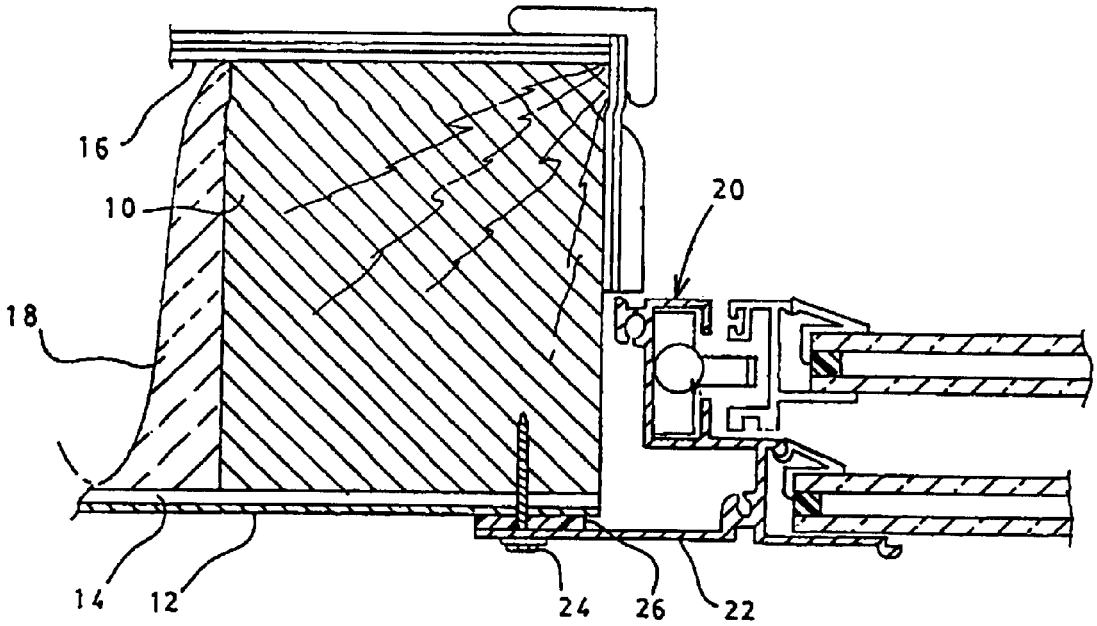
FIG. 1A (PRIOR ART)

The departure of the present invention from the prior art of window/siding relationships will be better understood by first considering the construction that had existed prior to the present invention. Therefore, referring to FIG. 1A, shown therein is an early wall/window structure as utilized in manufactured housing. The frame of the housing unit was typically a series of 2 in.×2 in. elements 10 that were covered on the exterior with sheet metal 12 which was, in some embodiments, embossed or corrugated to give some improved visual appearance. There may be, or may not be, a thin sheeting layer 14 The inner surface of this building frame was typically covered with panelling 16, and the void between the layers was filled with insulation 18. At places where windows were desired, an opening was cut through the wall of appropriate size, and a prefabricated window unit 20 was inserted having a perimeter flange 22. Although this FIG. 1A (and FIGS. 1B–1D) illustrate upper and lower double-glazed window sashes, it will be understood that windows for a single-glazed sash are fabricated in a similar manner. Appropriate fasteners 24 secured the window unit to the wall, and a suitable mastic 26 on the reverse side of the flange provided sealing against the weather.

Figure 1B:
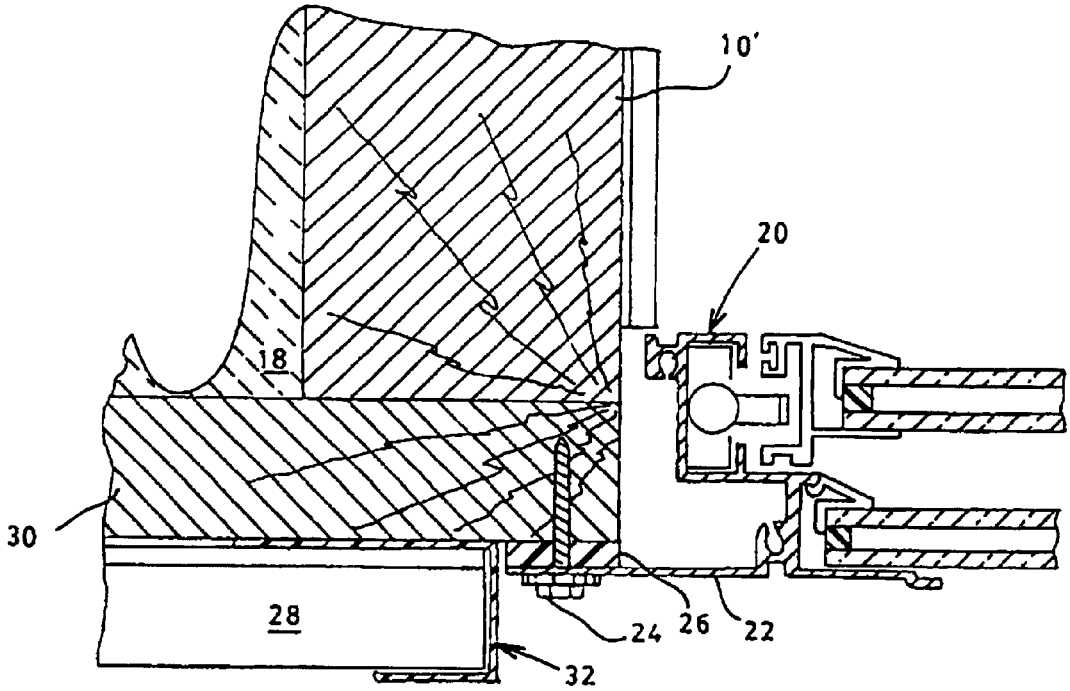
FIG. 1B (PRIOR ART)
FIG. 1B is drawing showing the use of the state-of-the-art window frame of FIG. 1A as utilized in manufactured housing fabrication where the exterior of the housing unit is lap siding, particularly vinyl or aluminum siding, and the ends of the siding are encased in a J-rail element positioned so as to abut the flange of the window frame.

In some subsequent manufactured homes, lap siding was employed, as illustrated at 28 in FIG. 1B, this siding having a sloped surface, For this construction the window unit 20 was installed in an opening in the wall by passing the fasteners 24 through the flange 22 into the frame members (typically into the studding 10'), or into sheathing 30 if such was used. The siding 28 was fastened to the exterior of the wall after a J-rail unit 32 was attached so as to abut the flange 22, the J-rail covering the ends of the lap siding. As before, a sealant 26 was typically employed to prevent ingress of moisture. With this construction the fasteners 24 through the flange 22 were visible in the completed building.

Figure 1C:
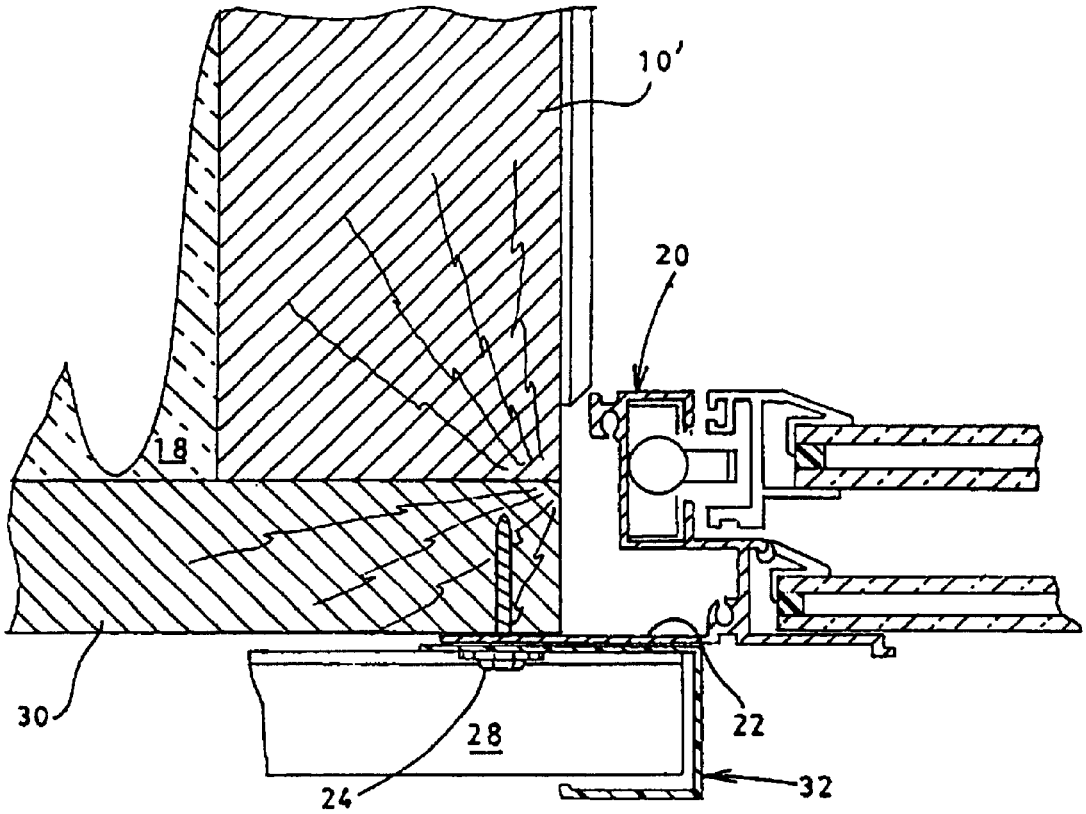
FIG. 1C (PRIOR ART)
FIG. 1C is a drawing illustrating another utilization of a J-rail element for covering ends of lap siding, with this J-rail element overlapping the flange of the window unit.

A slight variation of this type of installation of a prefabricated window unit 20 is illustrated in FIG. 1C. By installing the J-rail unit 32 over the flange 22 all of the fasteners 24 are hidden and improved weather sealing is accomplished.

Figure 1D:
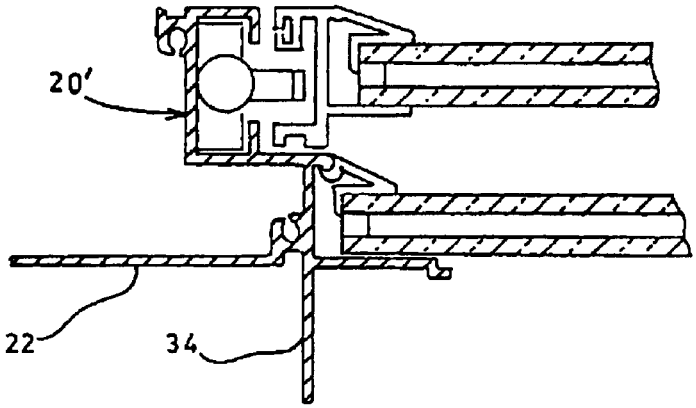
FIG. 1D (PRIOR ART)
FIG. 1D is a drawing illustrating a modification of the state-of-the-art window frame that can be used with either installation practice illustrated in FIGS. 1B or 1C.

Some commercial manufacturers of prefabricated window units produced a window that permitted the abutment of brick mold along the edge. This structure is shown in FIG. 1D at 20' and illustrates an extension 34 on the body portion of the frame. This style of prefabricated window has also been used like that illustrated in FIGS. 1B and 1C together with a separate J-rail element 32.

The embodiments of the prior art, in addition to being used in manufactured housing, have routinely been used in renovation work where new siding and/or windows are installed.

Figure 2:
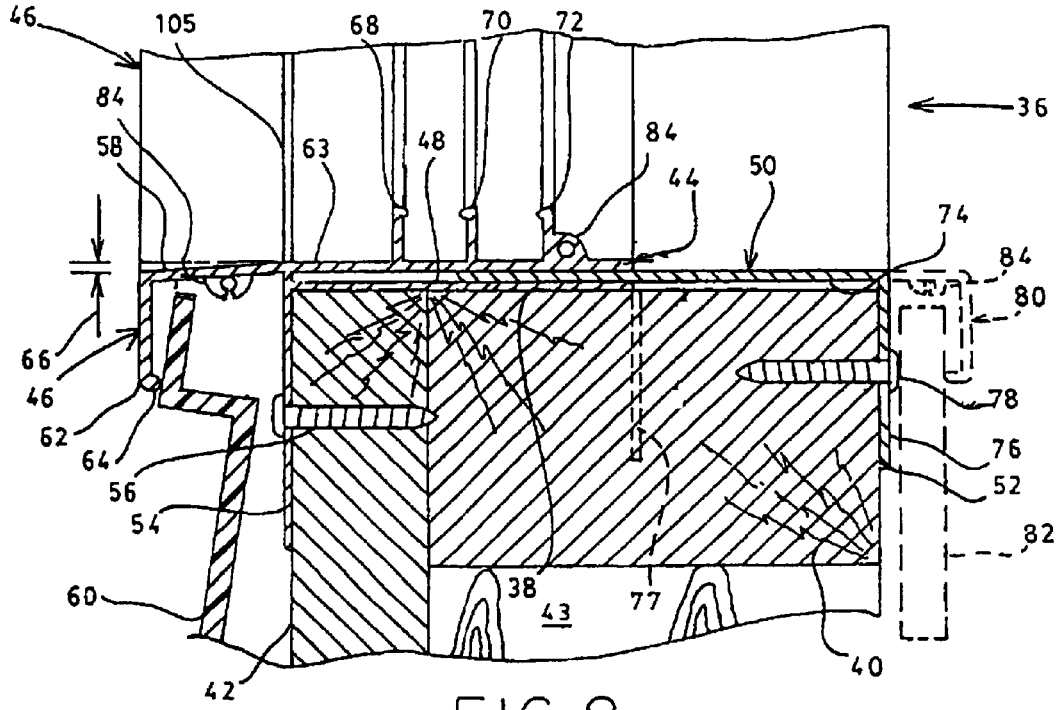
FIG. 2 is a cross sectional drawing of a sill portion of a window frame according to the present invention.

In order to overcome the drawbacks arising from the constructions illustrated in FIGS. 1A–1C, the present invention is depicted at 36 in FIG. 2 wherein the sill portion of the invention is shown in a cut-away cross section. The window frame 36 is placed in an opening 38 in the building that is at least partially defined by a typical frame sill 40 and typical sheathing 42. Also, a typical wall stud 43 is illustrated. This window frame 36 has a body portion 44 that generally circumscribes the wall opening 38 and extends from proximate the exterior of the sheathing 42 to at least midway the thickness of the building wall, and an integral J-rail return portion 46 that extends beyond the sheathing. In this embodiment the body portion 44 is provided with a slot 48 to accept, in sliding relationship, a body extension portion 50 such that the window frame extends toward the interior 52 of the building wall. This will be described in greater detail hereinafter.

The J-rail return portion 46 has three major components. There is a flange member 54 (typically about 1½ inch wide) that provides for the attachment of the window frame 36 to the sheathing 42 using, for example, nails or screws 56. There is an outwardly projecting member 58 having a length (typically about ¾ inch) away from the sheathing 42 that is substantially the same as thickness of lap siding 60, and a return portion 62 that, in this sill portion, extends downwardly so as to be parallel to the flange member 54. The length of this return portion 62, which is typically about ¾ inch, is sufficient to cover the edge of the siding 60 even when the siding contracts under low temperatures. In a preferred embodiment, the distal edge of this return portion 62 has a reversely-directed bead 64 to prevent chaffing of the siding 60 during relative movement therebetween. Because this is the sill portion of the window frame, the outwardly extended portion 58 of the J-rail return 46 (and the outer edge 63 of the body portion 44) are sloped as indicated by the arrows at 66 to allow drainage of water.

The body portion 44 of the window frame 36 is typically provided with a plurality of window sash retainer elements, such as depicted at 68, 70, and 72 as will be known to persons skilled in the art. As stated above, the body portion 44 is provided with a slot 48 for slidably receiving a tongue portion 74 of the body extension portion 50 to adjust for wall thickness. This body extension portion 50 can terminate at the frame inner wall 52 of the building with a flange 76 which is fastened to the building frame as with nails or screws 78. If the wall is relatively thin, the flange 76 would be at the position indicated at 77. Alternatively, the body extension portion 50 can be terminated with a J-rail return 80 such that edges of interior wall covering 82 are covered, and that the wall covering 82 covers the fasteners 78. In this embodiment, the flange portion of the J-rail return substitutes for and serves the function of flange 76.

FIG. 2 also illustrates that portions of the window frame 36 are provided with means for joining the sill portion to jam portions, and a header portion to the jam portions. Typically, this is accomplished by providing screw-receiving bosses as at 84. This will be discussed in greater detail in connection with a description of FIG. 4.

Figure 3:
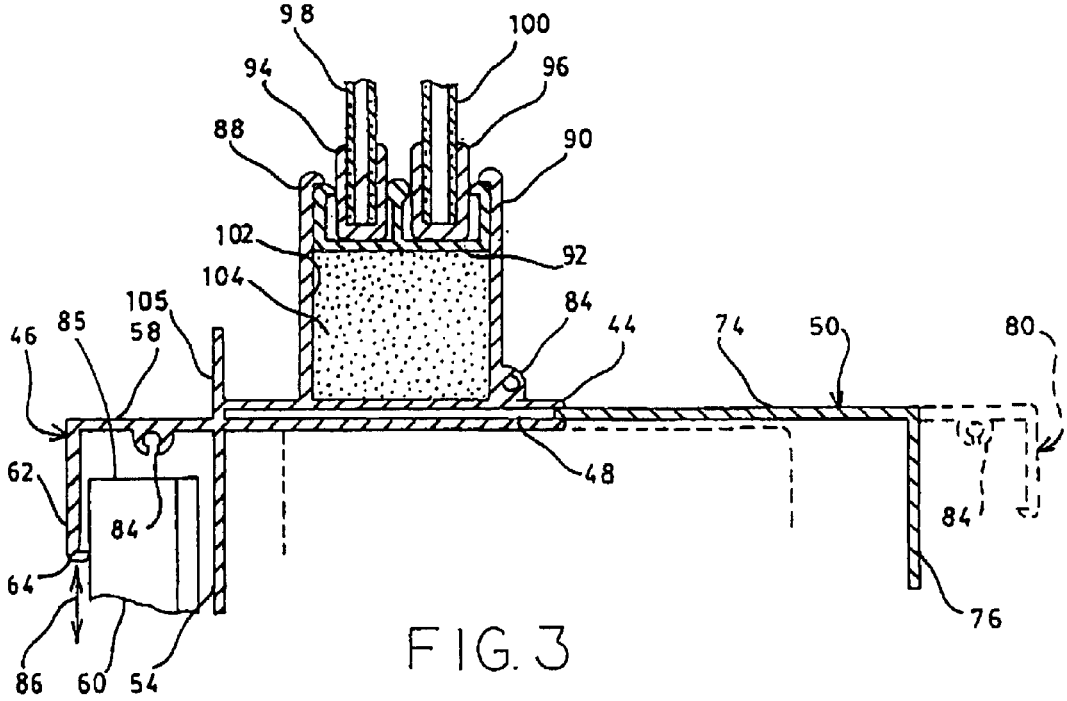
FIG. 3 is a cross sectional drawing of a jamb portion of a window frame according to the present invention.

A typical jamb portion of the window frame 36 is shown in cross section in FIG. 3. Here it can be seen how the return portion 62 of the J-rail return 46 covers the ends 85 of siding 60 even when the siding 60 moves during thermal fluctuations in directions indicated by the double-ended arrow 86. The embodiment of the window frame 36 illustrated has projections 88, 90 which receive a window sash retainer 92 for securing the two sashes 94, 96 each containing double glazing 98, 100. The void 102 between the sash retainer 82 and the window frame body member 44 is typically filled with foam insulation 104. The window frame 36 can include, if desired, a window screen retainer flange 105. Again, the sliding tongue 74 of the extension 50 in the slot 48 permits adjustment for wall thickness. Also, the interior can be terminated with a J-rail return 80 or simply by the flange 76.

Figure 4:
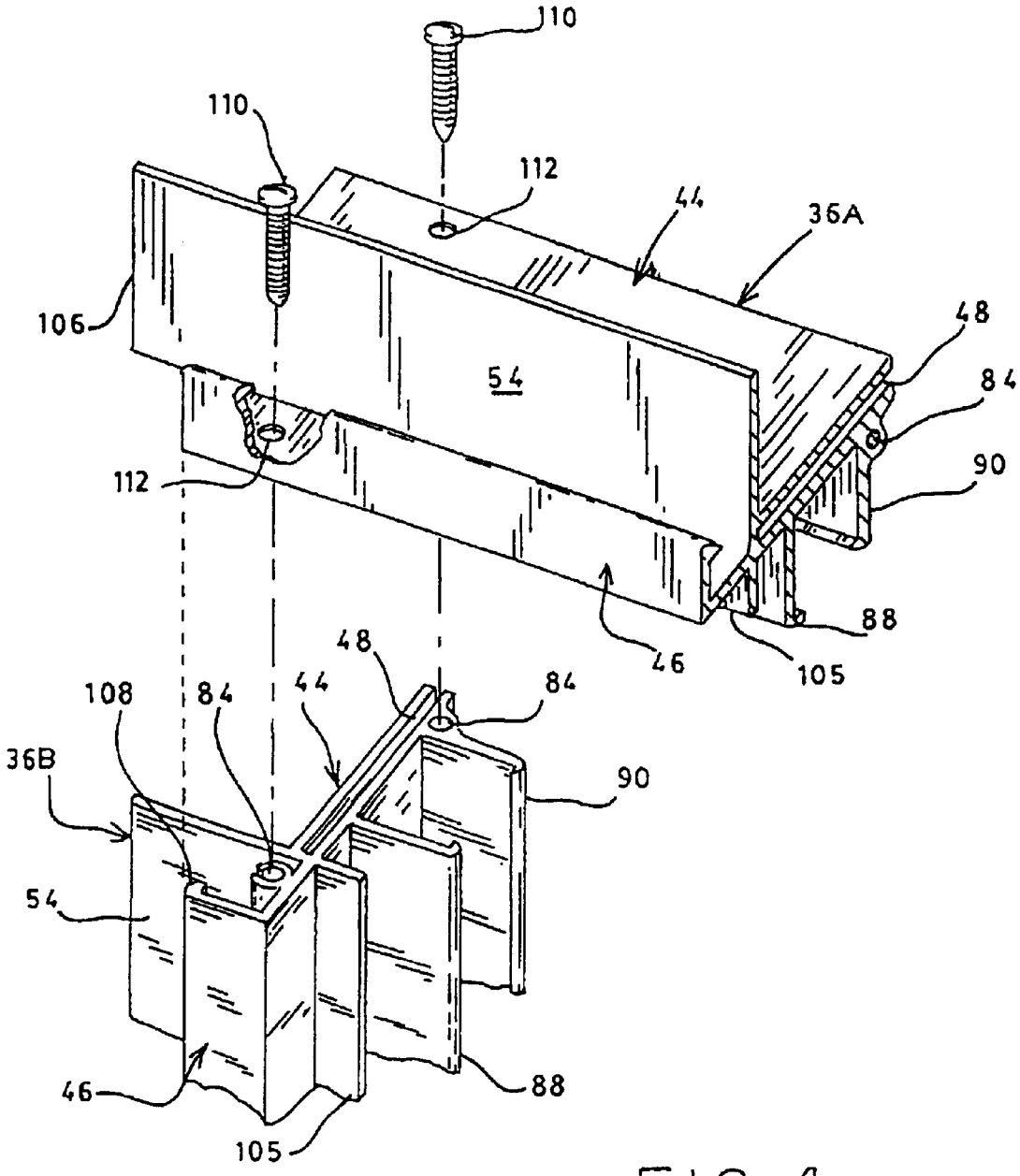
FIG. 4 is a perspective view, partially in section, of a window frame of the present invention.

A further view of the present window frame 36 is shown in the perspective cut-away view in FIG. 4. More specifically, this illustrates the header portion 36A of the frame and a side jam portion 36B, and means for joining these two portions. It will be understood that joining of other corners of the frame 36 are accomplished in a similar manner. As indicated, a portion of the header 36A is removed at end 106 so that the J-rail return 46 thereof aligns with end 108 of J-rail return 46 of the jam portion 36B. Although not shown, the projections 88, 90 of the header portion 36A are also cut back so as to have their ends in alignment with their corresponding parts of the jam portion 36B. The header portion 36A and the jam portion 36B are joined by passing screws 110 through openings 112 in the header portion 36A into the openings in the screw-retaining bosses 84. This permits fixedly joining of the two components of the window frame 36. Although this is the preferred method of joining the portions of the window frame 36, it will be understood that other conventional joining methods can be used. Since the header portion 36A overlaps the ends of the jam portions 36B of the window frame, the J-rail return 46 serves as a gutter element to any moisture falling upon siding of the housing unit.

From the above description of the components and the method of joining the portions of the window frame 36, it will be understood that the assembled frame 36 can be inserted in an opening 38 of a building structure. This opening 38 can be in a building as manufactured, or in a building under renovation. The window frame 36 is fastened to the building using screws, nails, staples, etc. passing through the flange 54. Lap siding 60 is then attached to the exterior of the building, with ends of the lap siding 60 being inserted into the slot formed by the flange 54 and the return portion 62. This return portion 62 is sufficient in width to maintain coverage of the ends of the siding 60 even during contraction of the siding 60 at lowered temperatures. The bead 64 prevents chaffing of the siding 60 during any movement thereof. In most installations, an inner portion of the window frame 36 is created by the addition of the extension 50 by inserting the tongue 74 into the slot 48. Thus, the window frame can be adjusted for the thickness of the structure wall. As stated the edge of the extension 50 can either terminate with the flanges 76, or a J-rail return member 80 can be an integral component.

From the foregoing it will be understood that a window frame has been developed that solves a problem of retaining and covering ends of lap siding with a singular structures, wherein the problem was solved in the prior art with separate structures. As a result, a considerable savings in time is achieved. Further, the result is a substantially improved aesthetic appearance of any building for which this improved window frame is used. While developed primarily for manufactured housing, the present window frame can be used in any building, either manufactured or stick built. It can be used in original construction, or can be installed during renovation of the building. Further, while designed primarily for use with lap siding applied to the exterior of the building, it can be used with other types of siding, some of which may abut the distal edge of the J-rail return portion 46. In a preferred form, the window frame is fabricated from a suitable plastic material (typically vinyl) using conventional extrusion techniques.

The description given above, and any typical sizes and materials, is given as an illustration of the present invention and not as a limitation. The invention is to be limited only by the appended claims and their equivalents.

What is claimed is:

1. A window frame for being fixedly mounted in an opening provided in a wall of a structure, the structure having a frame defining an inner wall and an outer wall, said window frame comprising:

a window frame body member for being received in and circumscribing the opening in the wall and adapted to extend from proximate the outer wall toward the inner wall when received in the opening, said window frame body member having a retainer means for receiving and supporting at least one window, said window frame body member having a header portion, a sill portion, and first and second jamb portions;

a J-rail return member integrally formed with said window frame body member so as to extend outward from said window frame body member when said window frame body member is received in the opening, said J-rail return member having a) a flange portion for extending radially around the opening and for attachment of said window frame to the structure, b) a projecting portion extending away from said flange portion in a direction perpendicular to said flange portion, wherein the projecting portion of said header portion is continuous and unperforated from an outer edge of said first jamb section to said outer edge of second jamb section, and c) a return portion having a proximate edge and a distal edge, said proximate edge being connected to an outermost extent of said projecting portion, said return portion being substantially parallel with said flange portion to define a substantially rectangularly shaped slot between said return portion and said flange portion, said slot having an opening at said distal edge of said return portion for accepting siding to be attached to the outer wall of the structure, said return portion having a width *of at least about ¾ inch and effective* to cover the siding [even during any contraction of the siding] *and to accommodate movement of said siding due to thermal fluctuation*, said J rail return [portion] *member* of said header portion being aligned with the J-rail return [portion] *member* of said jamb portions thereby serving as a rain gutter for said window frame whereby said window frame can be installed as a unit within the opening of the structure with minimal labor to receive at least one window and the siding in a secure manner.

2. The window frame of claim 1 wherein said window frame body member is of extruded vinyl and said J-rail [portion] *return member* is integrally formed with said window body member.

3. The window frame of claim 1 wherein said distal edge of said return portion is provided with a raised bead on a side toward said flange portion, said raised bead for reducing chaffing of the siding during any movement of the siding.

4. The window frame of claim 1 further comprising a window body extension member slidably associated with said window frame body member to extend said window frame to the inner wall of the structure.

5. A window frame for being fixedly mounted in an opening provided in a wall of a structure, the structure having a frame defining an inner wall and an outer wall, said window frame comprising:

a window frame body member for being received in and circumscribing the opening in the wall and adapted to extend from proximate the outer wall toward the inner wall when received in the opening, said window frame body member having a header portion, a sill portion, and first and second jamb portions and a retainer for receiving and supporting at least one window, a J-rail return member integrally formed with said window frame body member so as to extend outward from said window frame body member when said window frame body member is received in the opening, said J-rail return member having a) a *continuous* flange portion for extending radially around the *entire* opening and for attachment of said window frame to the structure, b) a projecting portion extending away from said flange portion in a direction perpendicular to said flange portion, and c) a return portion having a proximate edge and a distal edge, said proximate edge being connected to said projecting portion, said return portion being substantially parallel with said flange portion to define a substantially rectangularly shaped slot between said return portion and said flange portion, said slot having an opening at said distal edge of said return portion for accepting siding to be attached to the outer wall of the structure, said return portion having a width *of at least about ¾ inch and effective* to cover the siding [even during any contraction of the siding] *and to accommodate movement of said siding due to thermal fluctuation*, said J rail return [portion] *member* of said header portion being aligned with the J-rail return [portion] *member* of said jamb portions thereby serving as a rain gutter for said window frame whereby said window frame can be installed as a unit within the opening of the structure with minimal labor to receive at least one window and the siding in a secure manner.

6. The window frame of claim 5 wherein the distal edge of the return portion is provided with a raised bead on a side toward the flange portion for reducing chaffing of the siding during any movement of the siding.

7. The window frame of claim 5 which further comprises a window body extension member slidably associated with the window frame body member to extend the window frame to the inner wall of the structure.

*8. A window assembly comprising a window frame fixedly mounted in an opening provided in a wall of a structure, the structure having a frame defining an inner wall and an outer wall, said window frame comprising:*

*a window frame body member for being received in and circumscribing the opening in the wall and adapted to extend from proximate the outer wall toward the inner wall when received in the opening, said window frame body member having a retainer for receiving and supporting at least one window said window frame body member having a header portion, a sill portion and a first and second jamb portions,*

*a J-rail return member integrally formed with said window frame body member so as to extend outward from said window frame body member when said window frame body member is received in the opening, said J-rail return member having*

*a) a flange portion for extending radially around the opening and for attachment of said window frame to the structure said flange portion fastened to said wall;*

*b) a projecting portion extending away from said flange portion in a direction perpendicular to said flange portion, wherein the projecting portion of said header portion is continuous and unperforated from said first jamb section to said second jamb section, and*

*c) a return portion having a proximate edge and a distal edge, said proximate edge being connected to an outermost extent of said projecting portion, said return portion being substantially parallel with said flange portion to define a substantially rectangularly-shaped slot between said return portion and said flange portion, said slot having an opening at said distal edge of said return portion for accepting siding to be attached to the outer wall of the structure, said return portion having a width of at least about ¾ inch and effective to cover the siding and to accommodate movement of said siding due to thermal fluctuation, whereby said window frame is installed as a unit within the opening of the structure with minimal labor to receive at least one window;*

*and siding covering said wall said siding having terminal edges in said J rail return member surrounding said*

*window and at least one bottom edge in said J rail return member on said header portion and an upper edge of said siding in said channel in said sill portion said J rail return member on said header portion acting as a rain gutter for said window frame.*

*9. The window frame assembly claimed in claim 8 wherein said projecting portion on said header portion is unperforated from said first jamb section to said second jamb section.*

*10. The window frame assembly claimed in claim 9 further comprising first and second windows in said retainer.*

*11. A window frame for being fixedly mounted in an opening provided in a wall of a structure, the structure having a frame defining an inner wall and an outer wall, said window frame comprising:*

*a window frame body member for being received in and circumscribing the opening in the wall and adapted to extend from proximate the outer wall toward the inner wall when received in the opening, said window frame body member having a retainer for receiving and supporting at least one window said window frame body member having a header portion, a sill portion and a first and second jamb portions;*

*a J-rail return member integrally formed with said window frame body member so as to extend outward from said window frame body member when said window frame body member is received in the opening, said J-rail return member having*

*a) a continuous flange portion for extending radially around the entire opening and for attachment of said window frame to the structure,*

*b) a projecting portion extending away from said flange portion in a direction perpendicular to said flange portion, and*

*c) a return portion having a proximate edge and a distal edge, said proximate edge being connected to an outermost extent of said projecting portion, said return portion being substantially parallel with said flange portion to define a substantially rectangularly-shaped slot between said return portion and said flange portion, said slot having an opening at said distal edge of said return portion for accepting siding to be attached to the outer wall of the structure, said return portion having a width of at least about ¾ inch and effective to cover the siding and to accommodate movement of said siding due to thermal fluctuation, said J rail return member providing an unperforated channel on said header portion from beyond an inner edge of said first jamb section to beyond an inner edge of said second jamb section said J rail return member having a size effective to receive siding and conceal cut edges of said siding to provide a neat finished appearance,*

*whereby said window frame can be installed as a unit within the opening of the structure with minimal labor to receive at least one window and the siding in a secure manner.*

*12. The window frame of claim 8 wherein said window frame body member is of extruded vinyl and said J-rail return member is integrally formed with said window body member.*

*13. The window assembly claimed in claim 8 wherein said projecting portion has a width approximately equal to a width of said siding thereby concealing any exposed edges of said siding in such a J rail return member.*

* * * * *